(12) United States Patent
Twerdochlib

(10) Patent No.: US 7,987,725 B2
(45) Date of Patent: Aug. 2, 2011

(54) METHOD OF MATCHING SENSORS IN A MULTI-PROBE TURBINE BLADE VIBRATION MONITOR

(75) Inventor: Michael Twerdochlib, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 835 days.

(21) Appl. No.: 11/923,748

(22) Filed: Oct. 25, 2007

(65) Prior Publication Data

US 2009/0078052 A1 Mar. 26, 2009

Related U.S. Application Data

(60) Provisional application No. 60/974,134, filed on Sep. 21, 2007.

(51) Int. Cl.
*G01H 11/00* (2006.01)
(52) U.S. Cl. .................. 73/661; 73/584; 73/593
(58) Field of Classification Search .......... 73/660, 73/593, 583, 584, 661, 662
See application file for complete search history.

(56) References Cited

U.S. PATENT DOCUMENTS

| | | | | | |
|---|---|---|---|---|---|
| 4,020,678 | A | * | 5/1977 | Laue | 73/579 |
| 4,776,216 | A | * | 10/1988 | Barton et al. | 73/660 |
| 4,790,189 | A | | 12/1988 | Twerdochlib | |
| 4,887,468 | A | * | 12/1989 | McKendree et al. | 73/660 |
| 4,896,537 | A | | 1/1990 | Osborne | |
| 4,907,456 | A | * | 3/1990 | Rozelle | 73/660 |
| 4,934,192 | A | * | 6/1990 | Jenkins | 73/660 |
| 5,097,711 | A | * | 3/1992 | Rozelle et al. | 73/660 |
| 5,148,711 | A | | 9/1992 | Twerdochlib et al. | |
| 5,152,172 | A | * | 10/1992 | Leon et al. | 73/579 |
| 5,206,816 | A | * | 4/1993 | Hill et al. | 702/56 |
| 5,445,027 | A | * | 8/1995 | Zorner | 73/593 |
| 5,479,826 | A | * | 1/1996 | Twerdochlib et al. | 73/660 |
| 5,498,136 | A | | 3/1996 | Namura et al. | |
| 5,540,551 | A | | 7/1996 | Heinig | |
| 5,736,643 | A | * | 4/1998 | Bores et al. | 73/660 |
| 5,761,956 | A | * | 6/1998 | Beeson et al. | 73/660 |
| 5,974,882 | A | * | 11/1999 | Heath | 73/579 |
| 6,094,989 | A | * | 8/2000 | Twerdochlib | 73/659 |
| 6,668,651 | B2 | * | 12/2003 | Beausseroy et al. | 73/579 |
| 6,679,121 | B2 | * | 1/2004 | Sonnichsen et al. | 73/660 |
| 6,708,565 | B2 | * | 3/2004 | Lin et al. | 73/660 |
| 7,082,371 | B2 | | 7/2006 | Griffin et al. | |
| 7,509,862 | B2 | * | 3/2009 | Cohen et al. | 73/660 |
| 7,654,145 | B2 | * | 2/2010 | Twerdochlib | 73/660 |
| 7,866,213 | B2 | * | 1/2011 | Twerdochlib | 73/659 |
| 2002/0059831 | A1 | * | 5/2002 | Naudet et al. | 73/579 |
| 2008/0206057 | A1 | * | 8/2008 | Twerdochlib | 416/190 |
| 2009/0078052 | A1 | * | 3/2009 | Twerdochlib | 73/660 |
| 2009/0078053 | A1 | * | 3/2009 | Twerdochlib | 73/661 |

* cited by examiner

*Primary Examiner* — Hezron Williams
*Assistant Examiner* — Samir M Shah

(57) ABSTRACT

A method of matching sensors in a multi-probe blade vibration monitor for a turbine. The method includes providing at least two probes mounted in a casing of the turbine adjacent to a rotating blade structure of the turbine. Targets are provided on radially outer portions of the blade structure. Each of the probes includes a sensor generating signals corresponding to target passing events, and a set of synchronous harmonics of the rotational speed of the rotor are produced for each sensor. The position of the sensors is adjusted such that the sets of harmonics of the sensors are substantially matched, indicating that the positions of the sensors are matched.

6 Claims, 7 Drawing Sheets

300
METHOD OF MATCHING SENSORS IN A MULTI-PROBE TURBINE BLADE VIBRATION MONITOR

This application claims priority to a provisional application filed on Sep. 21, 2007, having application No. 60/974,134, which is incorporated herein by reference.

FIELD OF THE INVENTION

The present invention relates to a method of monitoring a blade structure in a turbine and, more particularly, to a method of positioning sensors in a multi-probe blade vibration monitor for a turbine such that the sensors are located at the same axial location relative to the blade structure.

BACKGROUND OF THE INVENTION

A high speed turbo machine, such as, for example, a steam or gas turbine, generally comprises a plurality of blades arranged in axially oriented rows, the rows of blades being rotated in response to the force of a high pressure fluid flowing axially through the machine. Due to their complex design, natural resonant mechanical frequencies of the blades may coincide with or be excited by certain blade rotational speeds and rotational harmonics thereof. To prevent excessive vibration of the blade about its normal position, prudent design practice dictates that the blades be constructed such that the frequencies of the lowest modes fall between harmonics of the operating frequency of the turbine. In addition, the blades may be excited by non-synchronous forces such as aerodynamic buffeting or flutter. In order to avoid the vibration exceeding certain levels and setting up objectionable stresses in the blades, it is common to monitor the vibrations of the blades, both during the design and testing of the turbine and during normal operation of the turbine. For example, it is known to use non-contacting proximity sensors or probes to detect blade vibrations. The probes detect the actual time-of-arrival of each blade as it passes each probe and provide corresponding signals to a blade vibration monitor system (BVM). Small deviations due to vibration are extracted, from which the BVM may determine the amplitude, frequency, and phase of the vibration of each blade.

Many blade tip vibration monitors employ multiple sensors in order to provide multiple blade pass signals each revolution of the blades to remove frequency foldover that is inherent in single sensor blade tip instruments, and to measure synchronous vibration. However, when multiple sensors are used, there is typically no way to ensure that all of the sensors are exactly coplanar with the blade row. That is, the sensors may be misaligned relative to each other axially in a direction parallel to the axis of rotation of the blades, such that the sensors do not all sense the same location on the blade tip. Thus, while the blade pass signal is sampled multiple times each revolution, there is an error that is introduced in this sampling due to misalignment of the sensors and slight variances in the electrical performance of each sensor. This results in an error and spectral noise in the measurement.

SUMMARY OF THE INVENTION

In accordance with one aspect of the invention, a method of matching sensors in a multi-probe blade vibration monitor for a turbine is provided. The turbine comprises a plurality of radially extending blades mounted on a rotor for rotation about a rotational axis, and the blade structure includes a plurality of targets located at radially outer locations of the blade structure. The method comprises providing at least two probes mounted in a casing of the turbine adjacent to the blade structure, each of the probes including a sensor; generating signals from each of the sensors corresponding to target passing events when each target passes the sensors; analyzing the signals to create, for each sensor, a set of harmonics characteristic of the position of each of the sensors relative to the plurality of targets; and comparing the sets of harmonics for at least two of the sensors, and positioning the sensors such that, for at least two of the sensors, the sets of harmonics are substantially matched, indicating that the two sensors are at matched axial locations relative to the plurality of targets.

In accordance with another aspect of the invention, a method of matching sensors in a multi-probe blade vibration monitor for a turbine is provided. The turbine comprises a plurality of radially extending blades mounted on a rotor for rotation about a rotational axis, and the blade structure includes a plurality of targets located at radially outer locations of the blade structure. The method comprises providing at least two probes mounted in a casing of the turbine adjacent to the blade structure, each of the probes including a sensor; generating signals from each of the sensors corresponding to target passing events when each target passes the sensors; analyzing the signals to create, for each sensor, a set of synchronous harmonics of the rotational speed of the rotor; and positioning the sensors such that, for at least two of the sensors, the sets of harmonics are substantially matched, indicating that the two sensors are at matched axial locations relative to the plurality of targets.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
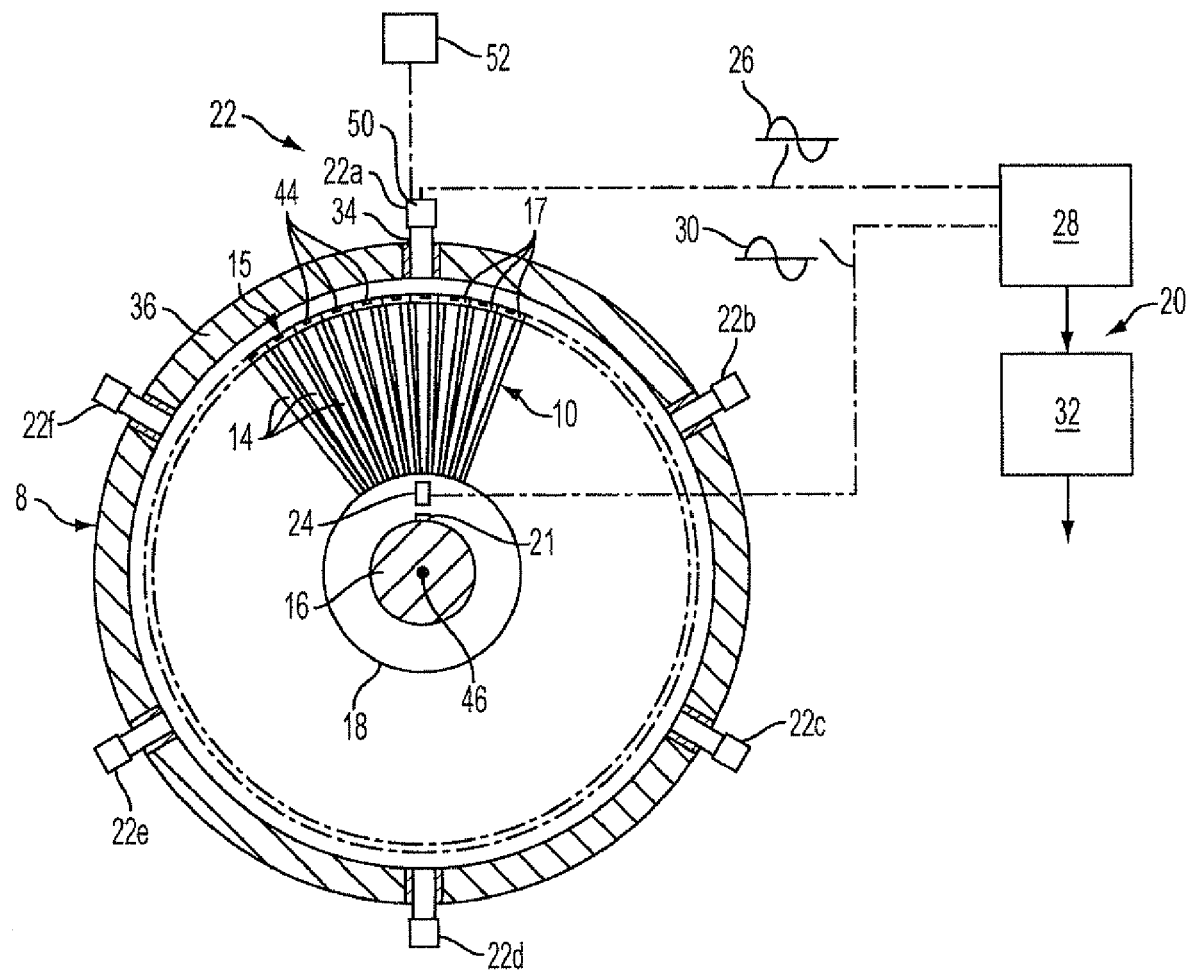
FIG. 1 is a diagrammatic view illustrating a turbine and a blade vibration monitor system for performing the present invention.

FIG. 1 diagrammatically illustrates a turbine 8 including a shrouded turbine blade row 10 in which the method of the present invention can be employed in a blade vibration monitoring system to monitor nonsynchronous turbine blade vibrations. Turbine blades 14 are connected to a rotor 16 by means of a rotor disk 18. Outer ends of the turbine blades 14 are interconnected by a circumferential outer shroud 15 defined by a plurality of shroud sections 17 attached to the blades 14.

A nonsynchronous turbine blade shroud vibration monitoring system (BSVM) 20 is also shown in FIG. 1. The BSVM 20 includes a set of turbine blade probe sensors 22. In the illustrated embodiment, the set of probe sensors 22 comprises individual probe sensor structures or probes 22a-22f in circumferentially spaced relation to each other for monitoring the vibration of the turbine blades 14. It should be understood that although six probes 22a-22f are illustrated herein with reference to the present invention, the set of probe sensors 22 may comprise any number of plural probes provided in circumferentially spaced relation to each other. In addition, although the illustrated probes 22a-22f are shown equally spaced around the turbine 8, the probes 22a-22f need not be equally or regularly spaced and, as a practical matter, the structure of the turbine 8 typically prevents regular spacing of the probes 22a-22f. Alternatively, some known analysis techniques may also require that the probes 22a-22f be positioned in a specified unequally spaced pattern.

As is further illustrated in FIG. 1, a reference sensor 24 is additionally provided. The reference sensor 24, in conjunction with an indicia 21 on the rotor 16, is operable to provide a once-per-revolution (OPR) reference pulse signal 30. The production of such a reference signal is commonly known in the turbine art. Input signals 26 from the probe sensor structure 22 are provided as inputs to a blade vibration processor 28 of the BSVM 20. The signal 30 from reference sensor 24 is additionally provided as an input to the blade vibration processor 28. The output of the blade vibration processor 28 is input to a signal analyzer 32 of the BSVM 20 which may perform signal conditioning and analysis.

Figure 2:
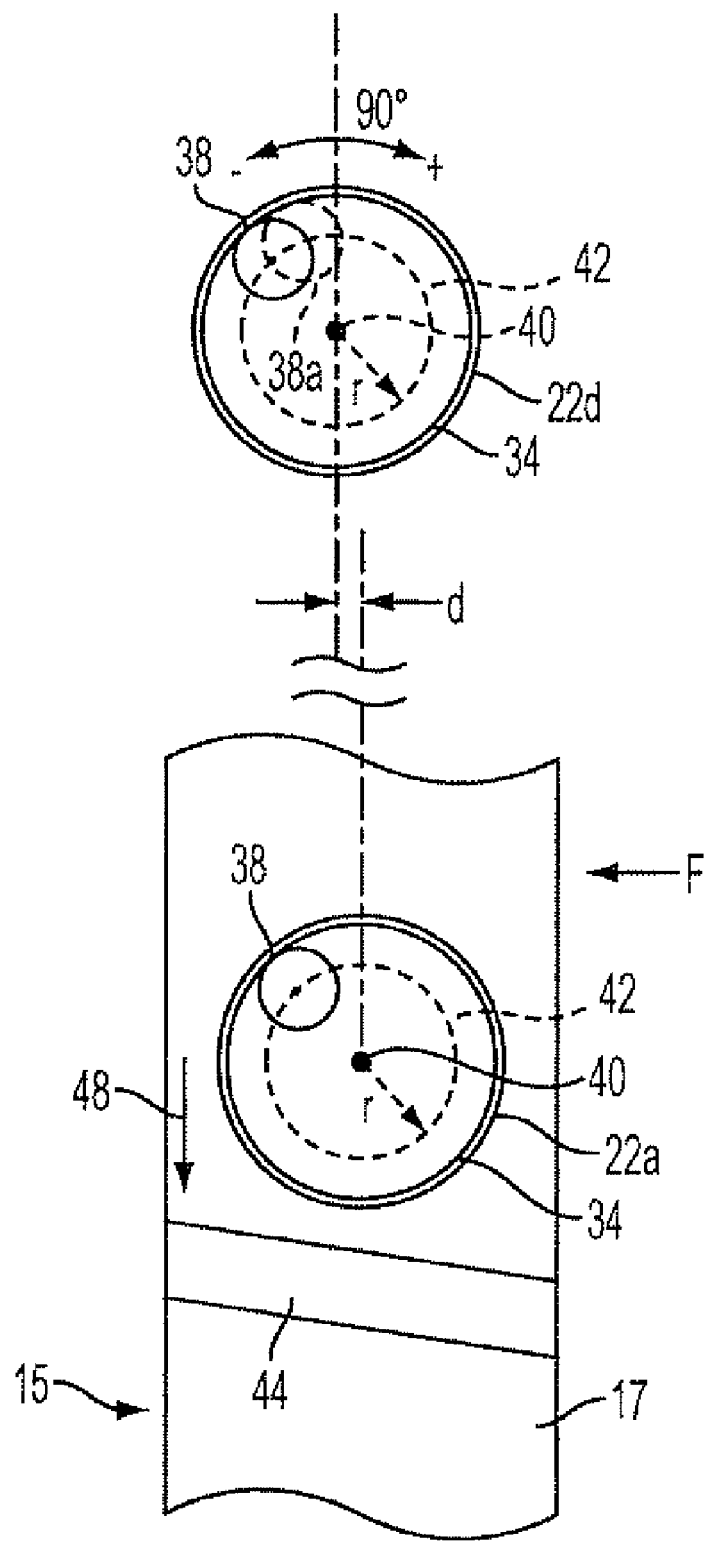
FIG. 2 is a diagrammatic view taken radially inwardly from an outer edge of a portion of the blade structure for the turbine and showing two probe locations.

Referring to FIGS. 1 and 2, the probes 22a-22f will be described with reference to the probe 22a, it being understood that the remaining probes 22b-22f may be of substantially similar construction. The probe 22a may comprise a probe shaft 34 for extending through a casing or wall portion 36 of the turbine 8. The probe shaft 34 supports a sensor 38 (FIG. 2) in eccentric relation to a probe rotational axis 40 about which the probe shaft 34 may be rotated. The center of the sensor 38 is spaced from the rotational axis 40 a known distance or radius, r, such that rotation of the probe shaft 34 about the axis 40 permits the sensor 38 to track a sensor circle 42 for selectively positioning the sensor 38 relative to the blades 14. In a preferred embodiment of the present invention, the radius, r, may be approximately 0.1 inch.

For the purposes of the following description, the position of sensor 38 is identified with reference to an angular position of the sensor 38, where the sensor 38 is positioned at a +90 degree position when it is aligned on a line extending perpendicular to a rotational or rotor axis 46 (FIG. 1) of the turbine rotor 16, as shown with reference to probe 22d in FIG. 2. As the probe shaft 34 is rotated to move the sensor 38 in the minus (−) direction, the sensor 38 is displaced axially downstream relative to a flow direction F, where the extreme downstream location for the sensor 38 is at or near 0 degrees. As the probe shaft 34 is rotated to move the sensor 38 in the plus (+) direction, the sensor 38 is displaced axially upstream relative to the flow direction F, where the extreme upstream location for the sensor is at or near 180 degrees.

The mounting of the probe sensor structure 22 through the wall portion 36 of the turbine 8 may be provided in a conventional manner, such as is described, for example, in U.S. Pat. No. 4,887,468, which patent is hereby incorporated by reference. The sensor 38 may be a variable reluctance sensor, i.e., a magnetic reluctance sensor, or may incorporate any practical method of sensing a blade or target passing event including, but not limited to, microwave or optical methods.

The sensor 38 produces a pulse at each target passing event comprising the passage of a blade target 44 in a path adjacent the sensor 38 as the blades 14 and shroud rotate about the rotor axis 46. It should be understood that the blade target 44 may be defined by a separate element, such as a magnetic strip, detected by the sensor 38, or by a surface feature on the shroud sections 17 such as slots or notches. In addition, the present invention may be performed with a blade structure comprising an unshrouded blade row (not shown) in which a target or other detectable feature may be provided on the outer edge of each blade.

Variations in the measured vibration amplitude, frequency and phase of the blades 14 is detected by a measurement of the passage of the targets 44 relative to the detected OPR reference signal 30 from the sensor 24, and may be specified in terms of an angle of rotation of the rotor 16 from the detection of the reference signal 30 to the target passing event corresponding to the sensor 38 producing an input signal 26. The signals 26 from the plurality of probes 22a-22f may differ from each other if they are not located in matched axial locations resulting in the sensors 38 on the probes 22a-22f not "seeing" the same locations on the targets 44 as the rotor 16 rotates. For example, as illustrated in FIG. 2, a sensor 38 of one of the probes, illustrated by probe 22a, is shown as being located in a slightly different axial position than the axial position of a sensor 38 of another of the probes, illustrated as probe 22d, where the respective probe axes 40 of the probes 22a and 22d are separated by a distance d, measured in the axial direction generally parallel to the flow direction F. In order to position the sensors 38 for the probes 22a and 22d at the same axial location, the sensor 38 for the probe 22d may be rotated along a circular path 42 to a new location depicted by sensor location 38a. Accordingly, the same location on the target 44 will pass the location of the sensor 38 for the probe 22a and the new sensor location 38a of the sensor 38 for the probe 22d.

In a BSVM analysis, the signals 26 received from the plurality of probes 22a-22f may be used to measure nonsynchronous flutter induced vibration in the shrouded blade row 10. The BSVM also calculates synchronous subharmonics, i.e., the harmonics of the running speed of the rotor 16. In previous known vibration analyses, these synchronous subharmonics (hereinafter referred to as "harmonics") were typically eliminated from the vibration analysis in that conventional turbine blade design dictates that any vibrations of interest occur between the harmonics of the running speed. That is, in order to avoid catastrophic failure of the turbine blades 14, the blades 14 must be designed such that any significant blade vibrations occur at frequencies which are not harmonics of the running speed. The present invention uses these previously ignored harmonics to perform a method of matching the locations of the probes 22a-22f and thereby reduce error and noise in the measurement performed by the BSVM.

By way of example, a blade row 10 may include 58 blades, with a corresponding number of targets 44, rotating at a speed of 3600 RPM. In a BSVM analysis, data is collected for a predetermined number of rotations of the rotor 16, e.g., typically 32 rotations, and the data is sorted to construct the time-of-arrival data for the targets 44 on the shroud 15. Additional detail with regard to BSVM analysis of shrouded blades is described in patent application U.S. Ser. No. 11/711,843 entitled BLADE SHROUD VIBRATION MONITOR, the entire disclosure of which is incorporated herein by reference.

In the present example, there are 58/2=29 harmonics of running speed, producing a (58×32)/2=928 point spectrum, i.e., subharmonics, spanning a frequency range of 0 to 1740 Hz, that are of interest in the present method of matching the probes 22a-22f. In particular, the 29 harmonics of running speed comprising subharmonics 32, 64, 96 . . . 928, corresponding to frequencies of 60, 120, 180 . . . 1740 Hz, are used for the present analysis. It should be noted that the so called "$0^{th}$ harmonic" related to a once-per-revolution indication, synchronous vibration that is typically not observed at steady state running speed is not of interest in the present analysis, nor is any signal offset induced by electronics or system software.

Figure 3:
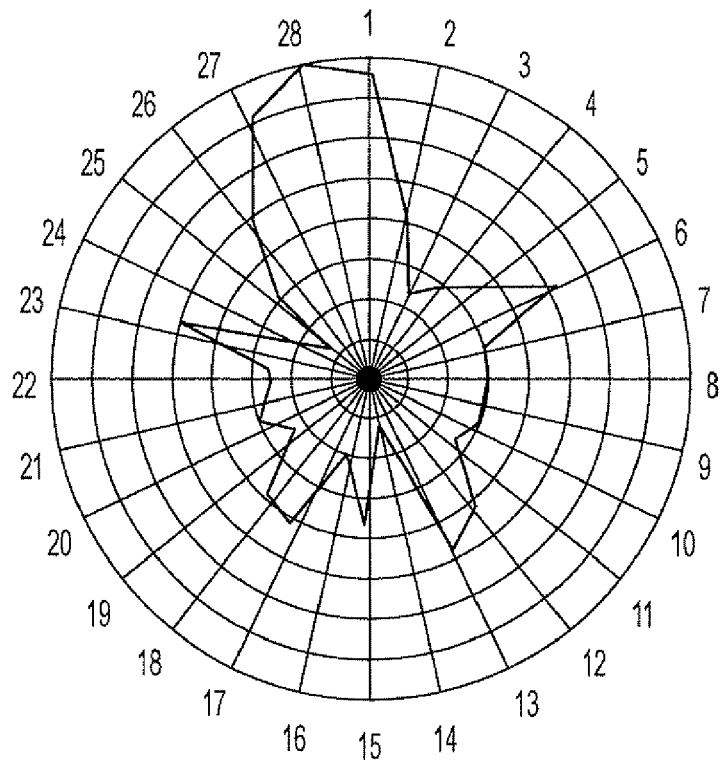
FIG. 3 is a polar plot of a spectral response showing 28 harmonics detected by a first probe for the blade vibration monitor system.
Figure 4:
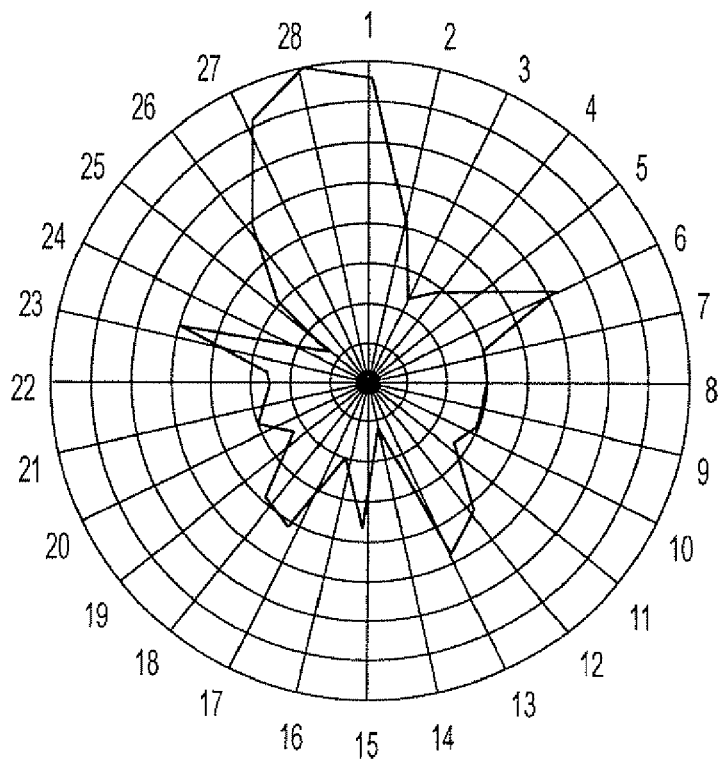
FIG. 4 is a polar plot of a spectral response showing 28 harmonics detected by a second probe for the blade vibration monitor system.
Figure 5:
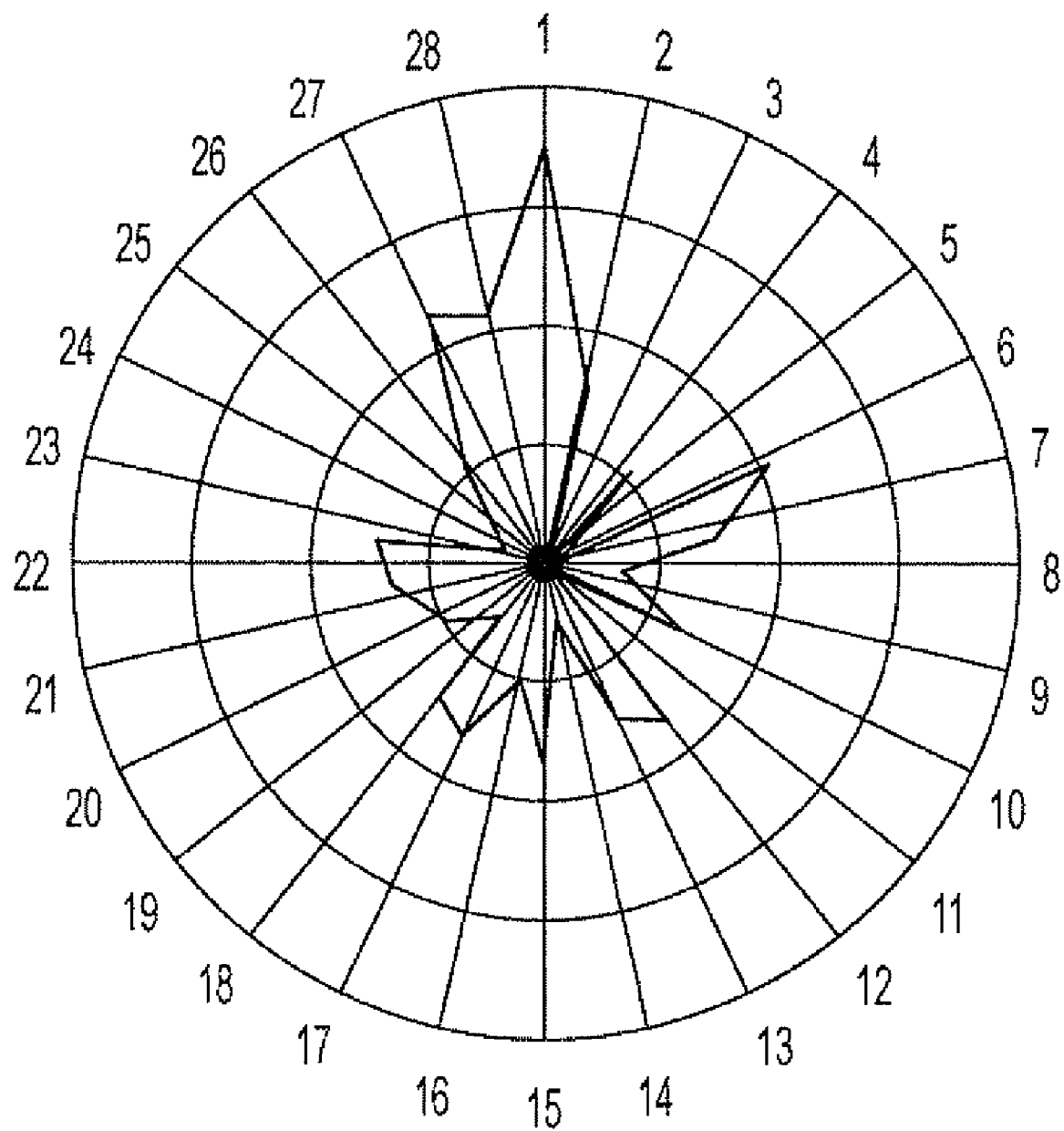
FIG. 5 is a polar plot of a spectral response showing 28 harmonics detected by a third probe for the blade vibration monitor system.
Figure 6A:
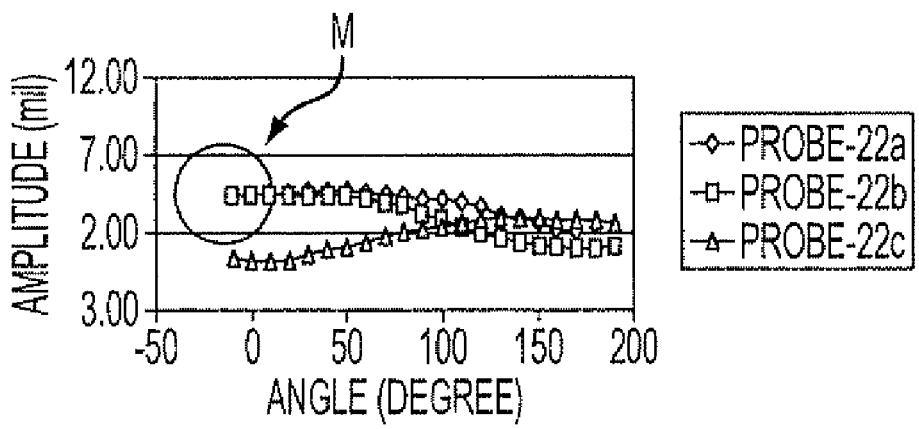
FIG. 6A is a plot of amplitude versus probe angle for a $3^{rd}$ harmonic detected by the first, second and third probes.
Figure 6B:
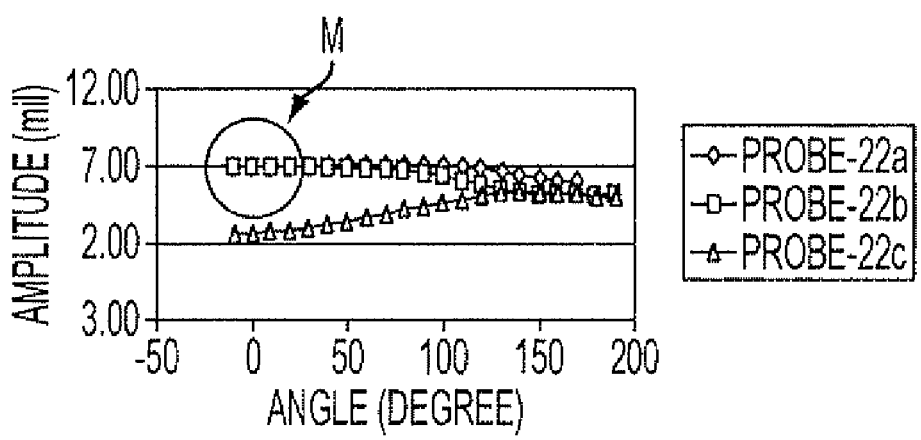
FIG. 6B is a plot of amplitude versus probe angle for a $4^{th}$ harmonic detected by the first, second and third probes detected by the first, second and third probes.
Figure 6C:
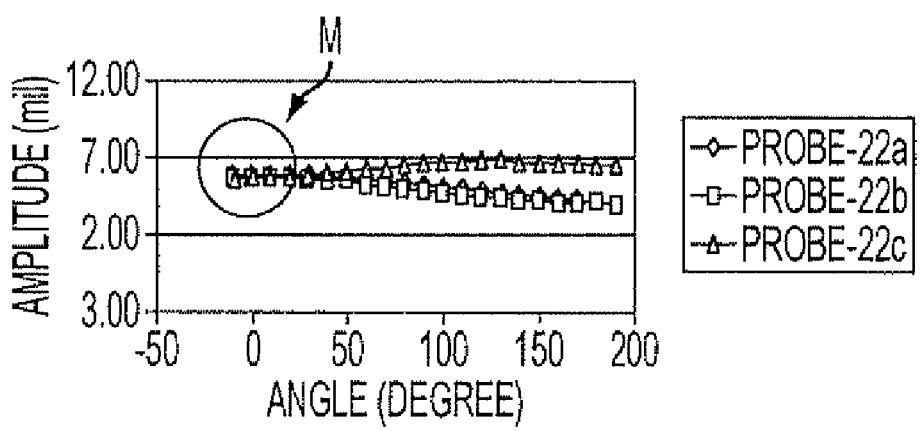
FIG. 6C is a plot of amplitude versus probe angle for a $5^{th}$ harmonic detected by the first, second and third probes.
Figure 6D:
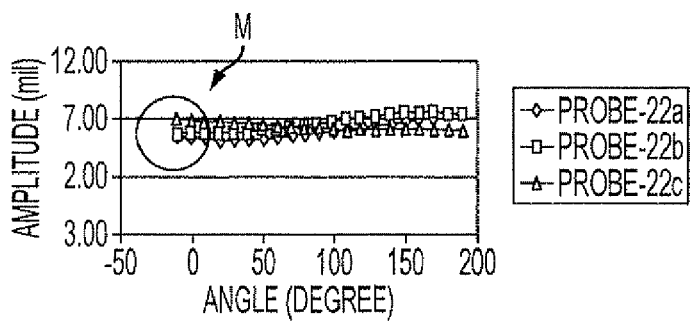
FIG. 6D is a plot of amplitude versus probe angle for a $7^{th}$ harmonic detected by the first, second and third probes.
Figure 6E:
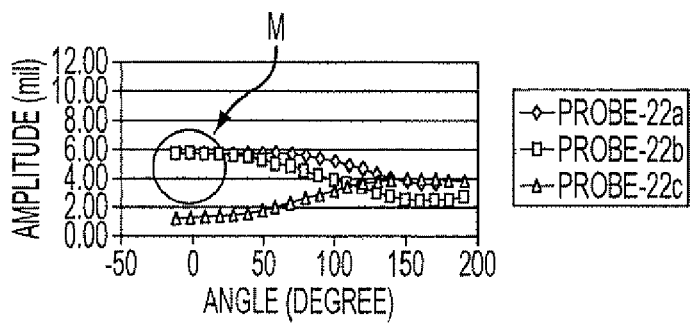
FIG. 6E is a plot of amplitude versus probe angle for a $11^{th}$ harmonic detected by the first, second and third probes.
Figure 6F:
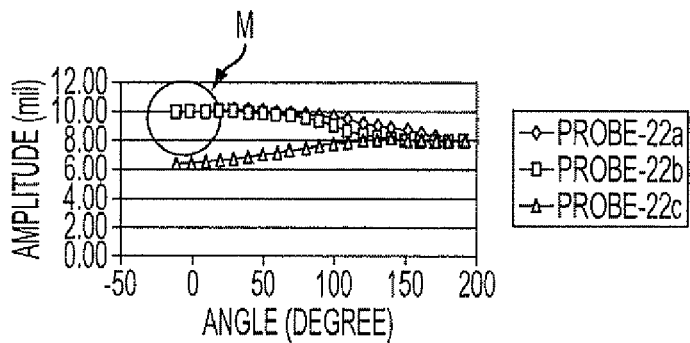
FIG. 6F is a plot of amplitude versus probe angle for a $13^{th}$ harmonic detected by the first, second and third probes.
Figure 6G:
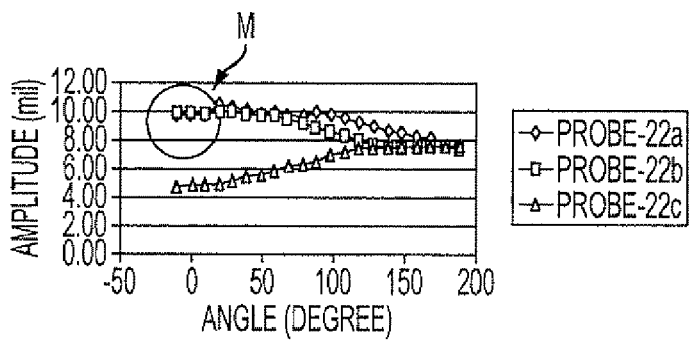
FIG. 6G is a plot of amplitude versus probe angle for a 26th harmonic detected by the first, second and third probes.

The magnitude of the signals produced at the noted harmonics is determined by structural target placement errors, including variations in spacing between the targets 44, as well as twisting, circumferential, axial and/or other relative movements between the targets 44 that may result from forces on the blades 14 during rotation of the rotor 16. A fingerprint is formed from the harmonics sensed by each probe 22a-22f. That is, for a given position of a probe 22a-22f, a unique fingerprint is determined by a set of harmonics from the signals 26 sensed for that particular position, and changing the position of the sensor 38 relative to the targets 44 will change the fingerprint. For example, a fingerprint for each of three probes, 22a, 22b, 22c, is illustrated in FIGS. 3, 4 and 5, respectively, in which the spectral lines of the harmonics are displayed in polar form, in which the radial location on the graph is indicative of the amplitude of the harmonic. The probes 22a and 22b of FIGS. 3 and 4, respectively, comprise a probe pair mounted at approximately similar axial locations substantially coplanar with a plane containing the targets 44 when the turbine 8 is on-line, while the third probe 22c is mounted axially displaced downstream approximately 0.5 inch from the location of probes 22a and 22b. The probes 22a, 22b, 22c are located with a maximum axial locating error of approximately 0.125 inch. In addition, given the known axial projection width of the targets 44, it is not possible for the sensors 38 of the probe pair 22a, 22b and the probe 22c to be over the targets 44 at the same time. However, all three probes 22a, 22b, 22c were set to position the sensors 38 at the same −10° position, i.e., approximately extreme downstream position, and each of the probes 22a, 22b, 22c produced the expected signals during the target passing events, where each probe 22a, 22b, 22c produced a distinctive fingerprint characteristic of the synchronous harmonic vibration data.

It should be noted that the fingerprints of FIGS. 3, 4 and 5 include only 28 points corresponding to 28, rather than 29, harmonics. This is because the $29^{th}$ harmonic is only half-filled, i.e. only includes a real component, whereas the determination of amplitude for each harmonic generally requires both a real and an imaginary component. Hence, the $29^{th}$ harmonic is not included in the harmonics defining the fingerprint.

The 28-point fingerprints of probes 22a and 22b, as seen in FIGS. 3 and 4, appear to be nearly identical, indicating that the position of this probe pair is closely matched; whereas the 28-point fingerprint of probe 22c, as seen in FIG. 5, is significantly different from that of FIGS. 3 and 4, indicating a mismatch of the position of probe 22c relative to that of probes 22a and 22b.

It should be noted that certain harmonics appear to be more sensitive than others to axial repositioning of the probes 22a-22f. This is illustrated in FIGS. 6A-G in which seven of the more sensitive or active harmonics have been identified. Specifically, harmonics 3, 4, 5, 7, 11, 13 and 26 are illustrated in FIGS. 6A-G, respectively, where the plots for probes 22a and 22b converge as the positions of the probes 22a and 22b are more closely matched to each other, as depicted at circled area M corresponding to the sensors 38 for the probes 22a, 22b being located at approximately the extreme upstream position. In contrast, the plot for probe 22c does not match the plots for the probe pair 22a, 22b due to the axial displacement of the probe 22c. Accordingly, a seven point subset of the harmonics is considered to be fully adequate to characterize the positioning of the sensors for the probes 22a-22f, and is advantageous over using all 28 harmonics which may result in a cluttered plot that can be difficult to display and visualize when comparing the probe positioning.

Figure 7:
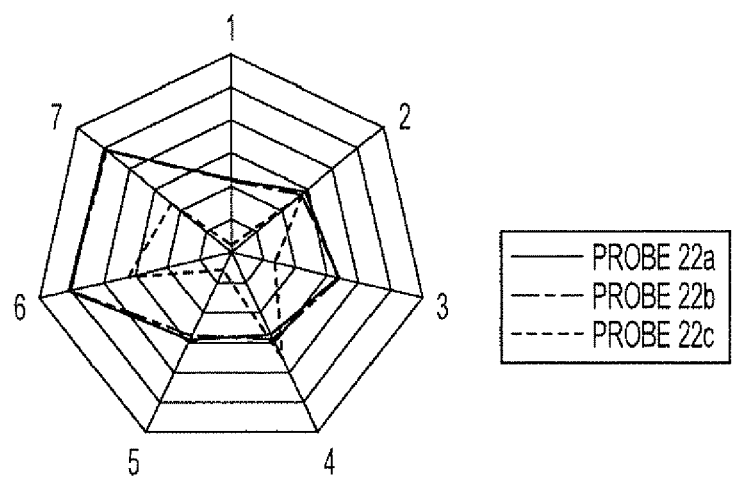
FIG. 7 is a polar plot of a spectral response detected by the first, second and third probes positioned at an angle of −10 degrees and showing the seven harmonics of FIGS. 6A-6G.
Figure 8:
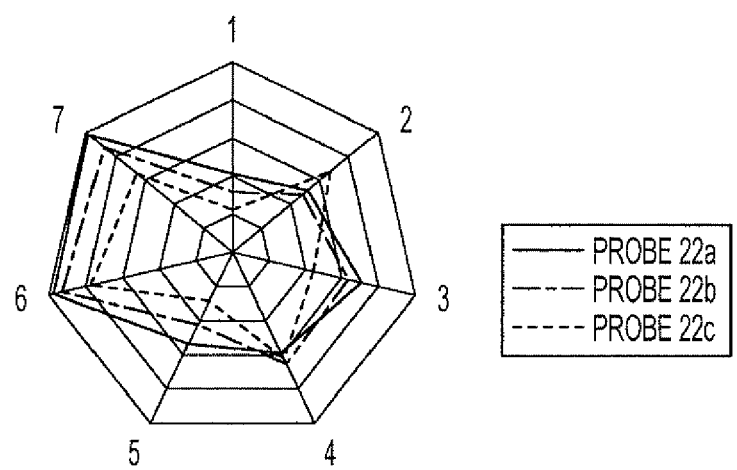
FIG. 8 is a polar plot of a spectral response detected by the first, second and third probes positioned at an angle of +90 degrees and showing the seven harmonics of FIGS. 6A-6G.
Figure 9:
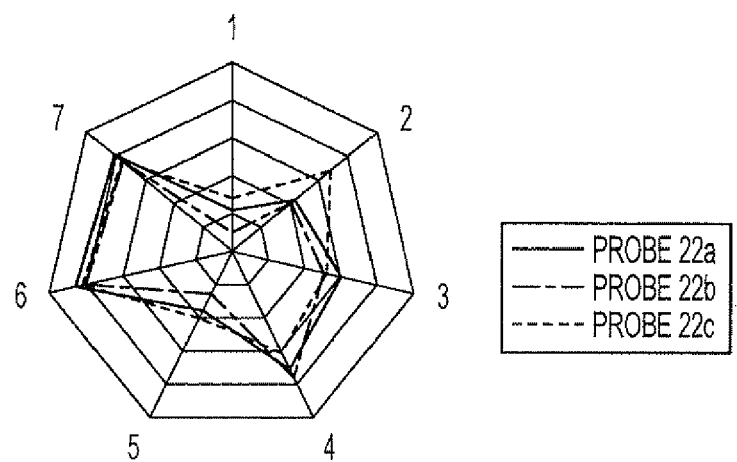
FIG. 9 is a polar plot of a spectral response detected by the first, second and third probes positioned at an angle of +170 degrees and showing the seven harmonics of FIGS. 6A-6G.

Referring to FIGS. 7, 8 and 9, the seven harmonics noted above are plotted in polar form for the three probes 22a, 22b, 22c with the sensors 38 for these probes located at three different rotational positions. Specifically, FIG. 7 is a 7-point fingerprint plot in which the sensors 38 for the probes 22a, 22b, 22c are all positioned at the −10 degree probe position, and in which it can be seen that the plots for the probe pair 22a, 22b lie substantially on top of one another and in which probe 22c is seen mismatched relative to probes 22a, 22b. FIG. 8 is a 7-point fingerprint plot in which the sensors 38 for the probes 22a, 22b, 22c are all positioned at the +90 degree probe position, and in which it can be seen that none of the plots match, indicating that all of the probes 22a, 22b, 22c are mismatched. FIG. 9 is a 7-point fingerprint plot in which the sensors 38 for the probes 22a, 22b, 22c are all positioned at the +170 degree probe position, and in which it can be seen that none of the plots match, indicating that all of the probes 22a, 22b, 22c are mismatched. It should be noted that a range of matched axial positions for at least the pair of probes 22a and 22b, as described in the present example, should be available as long as the sensors 38 for both probes 22a, 22b are fully over the targets 44.

In accordance with the above description, two or more of the probes 22a-22f may be located at matched axial positions by comparing the fingerprint plot of the probes 22a-22f to be matched to each other and rotating the probes 22a-22f until the respective plots are substantially similar to each other. When two or more of the probes 22a-22f are matched, their sensors 38 will be positioned at same axial position relative to the shroud 15 and will be "seeing" the same location on the targets 44 to produce substantially similar signals 26 for the nonsynchronous vibration monitoring operation, resulting in a reduction in error and spectral noise in the BSVM monitoring.

Referring to FIG. 1, the positioning of the probes 22a-22f may be performed automatically by a known driver 50 (only driver 50 on probe 22a identified in FIG. 1) for effecting precise rotational control of the probe 22a-22f. For example, the present embodiment may use a known precision translation instrument head on each of the probes 22a-22f to provide precise computer controlled rotational movement of the probes 22a-22f. In particular, the driver 50 may comprise a pulse width modulated drive DC motor operating through a planetary gear reduction drive train to provide a high torque precise rotational control to the probes 22a-22f. The driver 50 may operate under control of a computer in the BSVM 20 or, alternatively, an additional computer 52 may be provided for controlling the rotation of the probe 22a-22f.

It should be understood that while the above description has been made with reference to a system with a shrouded blade row, the method of matching probes may be applied in the same manner as described to a system having an unshrouded blade row. It should also be noted that the present description does not ensure that the sensors 38 of the probes 22a-22f are necessarily positioned at a particular or determined location, such as over the targets 44, and the matched probe locations may be obtained without the sensors 38 being located directly over the targets 44.

In addition, although six probes 22a-22f are described herein for the probe sensor 22, the present method may be performed with any number of two or more probes.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of matching sensors in a multi-probe blade vibration monitor for a turbine, said turbine comprising a plurality of radially extending blades mounted on a rotor for rotation about a rotational axis, said radially extending blade structure including a plurality of targets located at radially outer locations of said radially extending blade structure, the method comprising:
   providing at least two probes mounted in a casing of said turbine adjacent to said radially extending blade structure, each of said probes including a sensor;
   generating signals from each of said sensors corresponding to target passing events when each said target passes said sensors;
   analyzing said signals to create, for each said sensor, a set of harmonics characteristic of the position of each of said sensors relative to said plurality of targets; and
   comparing said sets of harmonics for at least two of said sensors, and positioning said sensors such that, for at least two of said sensors, said sets of harmonics are substantially matched, indicating that said at least two sensors are at matched axial locations relative to said plurality of targets
      wherein said step of positioning said sensors comprises moving at least one of said sensors about a rotational axis of a respective probe,
      wherein said at least one sensor is translated in an axial direction parallel to said rotational axis of said rotor during said movement about said rotational axis of said respective probe.

2. The method of claim 1, wherein said harmonics comprise synchronous harmonics of the rotational speed of said rotor.

3. The method of claim 1, wherein said step of comparing said sets of harmonics comprises comparing preselected harmonics that are sensitive to the position of said sensors relative to said targets.

4. The method of claim 3, wherein said harmonics comprise synchronous harmonics of the rotational speed of said rotor.

5. The method of claim 1, wherein said step of comparing said sets of harmonics comprises forming a plot of each said set of harmonics, each said plot defining a fingerprint corresponding to the position of a respective sensor.

6. The method of claim 5, wherein said sets of harmonics comprise selected subsets of synchronous harmonics of the rotational speed of said rotor.

\* \* \* \* \*